United States Patent
Shim

(10) Patent No.: US 8,260,298 B2
(45) Date of Patent: Sep. 4, 2012

(54) METHOD OF PREVENTING CALL DROP AND APPARATUS FOR PERFORMING THE SAME

(75) Inventor: Jeong-Hun Shim, Kyunggi-do (KR)

(73) Assignee: KTF Technologies, Inc., Kyunggi-Do (KR)

( * ) Notice: Subject to any disclaimer, the term of this patent is extended or adjusted under 35 U.S.C. 154(b) by 642 days.

(21) Appl. No.: 12/216,099

(22) Filed: Jun. 30, 2008

(65) Prior Publication Data

US 2009/0233603 A1    Sep. 17, 2009

(30) Foreign Application Priority Data

Mar. 12, 2008 (KR) .................. 10-2008-0022980
May 8, 2008  (KR) .................. 10-2008-0042735

(51) Int. Cl.
*H04W 36/00* (2009.01)

(52) U.S. Cl. ................................ 455/436; 455/412.1

(58) Field of Classification Search .......... 455/436–444, 455/412.1–414.4; 370/331
See application file for complete search history.

(56) References Cited

U.S. PATENT DOCUMENTS

2004/0203623 A1 * 10/2004 Wu .................. 455/412.1
* cited by examiner

*Primary Examiner* — Kamran Afshar
*Assistant Examiner* — Kashif Siddiqui
(74) *Attorney, Agent, or Firm* — Harness, Dickey & Pierce, PLC

(57) ABSTRACT

A method of preventing call drop in a mobile terminal when a serving radio network subsystem SRNS relocation to a target RNC from a source RNC is performed includes (a) receiving a control message in accordance with start of the SRNS relocation from the target RNC, (b) performing a RLC configuration procedure, (c) transmitting a complete message in accordance with the RLC configuration procedure to the target RNC, and (d) retransmitting the complete message to the target RNC in case that RLC reset is performed after the complete message is transmitted. As a result, call drop by exceptional case while the SRNS relocation is performed may be prevented.

18 Claims, 11 Drawing Sheets

METHOD OF PREVENTING CALL DROP AND APPARATUS FOR PERFORMING THE SAME

CROSS-REFERENCE TO RELATED APPLICATIONS

This application claims priority from Korean Patent Application No. 2008-22980 filed on Mar. 12, 2008, No. 2008-42735 filed on May 8, 2008, the contents of which are incorporated herein by reference in their entirety.

TECHNICAL FIELD

Example embodiment of the present invention relates to a method of preventing call drop and an apparatus for performing the same, more particularly relates to a method of preventing call drop by exceptional case while an SRNS reassignment is performed and an apparatus for performing the same.

BACKGROUND ART

An UMTS terrestrial radio access network (hereinafter, referred to as "UTRAN") of a third generation mobile communication system is made up of a plurality of radio network subsystems (hereinafter, referred to as "RNS"). Here, one RNS has a plurality of node Bs and radio network controllers (hereinafter, referred to as "RNC").

The node B connects a user equipment (hereinafter, referred to as "UE") to the UTRAN.

The RNC performs assignment and management of radio resource for each of the UEs.

The UE is connected to a core network (hereinafter, referred to as "CN") such as a mobile switching center or a SGSN through the RNC.

To set shortly connection path between the UE and the CN in response to moving of the UE, a RNC for the UE is shifted from a source RNC in present SRNS into a target RNC in another SRNS. This is referred to as an SRNS relocation.

The SRNS relocation is generally performed so that data are not lost, and so an acknowledged mode AM RLC entity of a user plane or a control plane is used in the SRNS assignment.

In the SRNS relocation, the source RNC transmits information concerning unidentified data to the target RNC through a down-link or provides serial number corresponding to the data through an up-link.

In case that the target RNC receives the information or the serial number, the SRNS relocation is performed between the target RNC and the UE. Here, the SRNS relocation is started through an UTRAN mobility information UMI message or a radio bearer reconfiguration RBR message defined by a 3GPP in accordance with a network mode.

However, a problem exists in that call drop may be occurred in case that RLC reset is performed or other exceptional case is occurred while the UMI message or the RBR message is delivered in the SRNS relocation.

FIG. 1 and FIG. 2 are views illustrating examples of call drop in conventional SRNS relocation. Particularly, FIG. 1 and FIG. 2 show call drop in an UMI procedure.

Referring to FIG. 1, in step S100, in case that the source RNC transmits information concerning unidentified data, etc. to the target RNC, the UMI procedure is started.

In step S102, a radio resource control RRC entity of the target RNC transmits an UMI message to a RRC entity of the UE.

In step S104, the RRC entity and a radio link control RLC entity of the UE perform a RLC configuration procedure.

In step S106, the RRC entity of the UE transmits an UMI confirm UMIC message to the RRC entity of the target RNC after the RLC configuration procedure is performed. Here, the SRNS relocation is normally completed only when the RLC entity of the UE receives ACK about the UMIC message from the RLC entity of the target RNC. For example, the RRC entity of the UE resets the RLC entity in accordance with the RLC configuration procedure, and then transmits the UMIC message having initial serial number SN0 to the RRC entity of the target RNC. Hence, the SRNS relocation is normally completed only when the RLC entity of the target RNC transmits the ACK (about the UMIC message) having next serial number to the RLC entity of the UE.

However, in case that the RLC entity of the target RNC transmits ACK having other serial number, e.g. SN9 not desired serial number SN1 to the RLC entity of the UE due to information concerning serial number provided from the source RNC to the target RLC in step S108, the RRC entity of the UE discriminates that the RLC entity of the UE does not receive normally the ACK about the UMIC message, and so the RRC entity of the UE performs a RRC disconnect procedure in step S110. As a result, call drop is occurred in step S112.

Hereinafter, another example of call drop will be described in detail with reference to accompanying drawing FIG. 2.

Steps S200 to S206 in FIG. 2, i.e. step of transmitting the UMI message from the target RNC, step of performing the RLC configuration and step of receiving the UMIC message are the same as those in FIG. 1.

Referring to FIG. 2, the target RNC awaits ACK (which is transmitted to the source RNC if the SRNC reassignment is not started) transmitted from the UE according as the target RNC receives the information concerning the unidentified data from the source RNC. Here, the target RNC should receive the ACK having serial number following serial number of the unidentified data. However, the RLC entity of the target RNC does not receive ACK having desired serial number due to performance of the RLC configuration procedure. As a result, the RLC entity of the target RNC transmits a RLC RESET message to the RLC entity of the UE in step S208.

In step S210, the RRC entity of the UE discriminates through the transmitted RLC RESET message that the RLC entity of the UE does not receive desired ACK, and performs a RRC disconnect procedure. Then, the UMI procedure is finished in step S212.

FIG. 3 and FIG. 4 are views illustrating another example of call drop. Particularly, FIG. 3 and FIG. 4 show call drop occurred when a RBR message or a RBRC message is delivered in accordance with a certain network mode in the SRNS relocation.

Referring to FIG. 3, in step S300, in case that the source RNC transmits information concerning the unidentified data, etc. to a target RNC, a RBR procedure is started.

In step S302, the RRC entity of the target RNC transmits a RBR message to the RRC entity of an UE.

In step S304, the RRC entity and the RLC entity of the UE perform an RLC configuration procedure.

In step S306, the RRC entity of the UE transmits a RBR complete RBRC message to the RRC entity of the target RNC after the RLC configuration procedure is performed. Here, the RRC entity of the UE resets the RLC entity in accordance with the RLC configuration procedure, and then transmits the RBRC message having an initial serial number SN0 to the target RNC.

On the other hand, the RBR procedure is normally completed only when the RLC entity of the UE receives ACK about the RBRC message from the RLC entity of the target RNC. For example, in case that the RBRC message having the serial number SN0 is transmitted, the SRNS assignment is normally completed only when the RLC entity of the UE receives the ACK (about the RBRC message) having next serial number from the RLC entity of the target RNC.

However, in case that the RLC entity of the target RNC transmits ACK having other serial number, e.g. SN32 not desired serial number SN1 to the RLC entity of the UE due to information concerning serial number provided from the source RNC to the target RLC in step S308, the RRC entity of the UE discriminates that the RLC entity of the UE does not receive desired ACK about the RBRC message, and so the RRC entity of the UE performs a RRC disconnect procedure in step S310. That is, the RRC disconnect procedure is performed because the serial number of the received ACK is not identical to desired serial number. As a result, the RBR procedure is failed, and thus call drop is occurred in step S312.

The above call drop may be occurred when serial number of the received ACK is not existed in an effective range.

FIG. 4 is a view illustrating still another example of call drop.

Steps S400 to S406 in FIG. 4, i.e. step of transmitting the RBR message from the target RNC, step of performing the RLC configuration and step of receiving the RBRC message are the same as those in FIG. 3.

Referring to FIG. 4, the target RNC awaits ACK (which is transmitted to the source RNC if the SRNC reassignment is not started) transmitted from the UE according as the target RNC receives the information concerning the unidentified data from the source RNC. Here, the target RNC should receive ACK having serial number following serial number the data transmitted from the source RNC. However, the RLC entity of the target RNC does not receive ACK having desired serial number due to performance of the RLC configuration procedure. As a result, the RLC entity of the target RNC transmits a RLC RESET message to the RLC entity of the UE in step S408.

In step S410, the RRC entity of the UE discriminates through the transmitted RLC RESET message that the RLC entity of the UE does not receive normally desired ACK, and performs a RRC disconnect procedure. Then, the RBR procedure is finished as fail state in step S412.

3GPP defines generally the SRNS relocation as to only case that a given message is normally delivered between the target RNC and the UE. However, the 3GPP does not define the SRNS relocation as to case that serial numbers delivered between the target RNC and the UE are not identical, or case that the target RNC and the UE do not receive a given message, e.g. ACK because a process between the UE and the source RNC is not finished.

In brief, the 3GPP does not define a method of processing the above exceptional cases when the exceptional cases are occurred between the target RNC and the UE. Accordingly, a problem exists in that the call drop is unconditionally performed whenever the exceptional cases are occurred.

DISCLOSURE

Technical Problem

Accordingly, the present invention is provided to substantially obviate one or more problems due to limitations and disadvantages of the related art.

Example embodiment of the present invention provides a method of preventing call drop though exceptional case is occurred in SRNS relocation and an apparatus for performing the same.

Technical Solution

A method of preventing call drop in a mobile terminal when a serving radio network subsystem SRNS relocation to a target RNC from a source RNC is performed according to one example embodiment of the present invention includes (a) receiving a control message in accordance with start of the SRNS relocation from the target RNC; (b) performing a RLC configuration procedure; (c) transmitting a complete message in accordance with the RLC configuration procedure to the target RNC; and (d) retransmitting he complete message to the target RNC in case that RLC reset is performed after the complete message is transmitted.

A method of preventing call drop in a target RNC when an SRNS relocation is performed according to one example embodiment of the present invention includes (a) transmitting a control message in accordance with start of the SRNS relocation to a mobile terminal; (b) receiving a complete message concerning a RLC configuration procedure from the mobile terminal; (c) receiving the complete message retransmitted from the mobile terminal in case that RLC entities of the mobile terminal and a target RNC are reset; and (d) transmitting a RLC STATUS protocol data unit RLC STATUS PDU having serial number following serial number of the complete message to the mobile terminal.

An apparatus according to one example embodiment of the present invention includes an RRC entity configured to receive a control message in accordance with start of an SRNS relocation from an RRC entity of a target RNC when the SRNS relocation to the target RNC from a source RNC is performed, transmit a complete message in accordance with RLC configuration, and retransmit the complete message to the RRC entity of the target RNC in case that RLC reset is performed after the complete message is transmitted; and an RLC entity configured to receive ACK about the retransmitted complete message from a RLC entity of the target RNC, wherein the RLC entity of the target RNC and the RLC entity of the apparatus are reset in case that exceptional case is occurred before ACK about the complete message in accordance with the RLC configuration is received.

A radio network controller RNC for managing an SRNS relocation includes an RRC entity configured to transmit a control message in accordance with start of the SRNS relocation to a mobile terminal in case that unidentified data and corresponding serial number are received from a source RNC, and receive a complete message about RLC configuration; and an RLC entity reset with a RLC entity of the mobile terminal in case that exceptional case is occurred before ACK about the complete message is not transmitted, and configured to transmit ACK about retransmitted complete message to a RLC entity of the mobile terminal in case that the complete message retransmitted from the mobile terminal in accordance with the RLC reset is received.

Advantageous Effects

In a method of preventing call drop and an apparatus for performing the same according to one example embodiment of the present invention, a mobile terminal retransmits an UMIC message to a target RNC in case that exceptional case is occurred, thereby preventing call drop.

In a method of preventing call drop and an apparatus for performing the same according to another example embodiment of the present invention, a mobile terminal retransmits an RBRC message to a target RNC in case that exceptional case is occurred while an SRNS relocation is performed, thereby preventing call drop.

BRIEF DESCRIPTION OF DRAWINGS

Example embodiments of the present invention will become more apparent by describing in detail example embodiments of the present invention with reference to the accompanying drawings, in which.

BEST MODE FOR CARRYING OUT THE INVENTION

Figure 1:
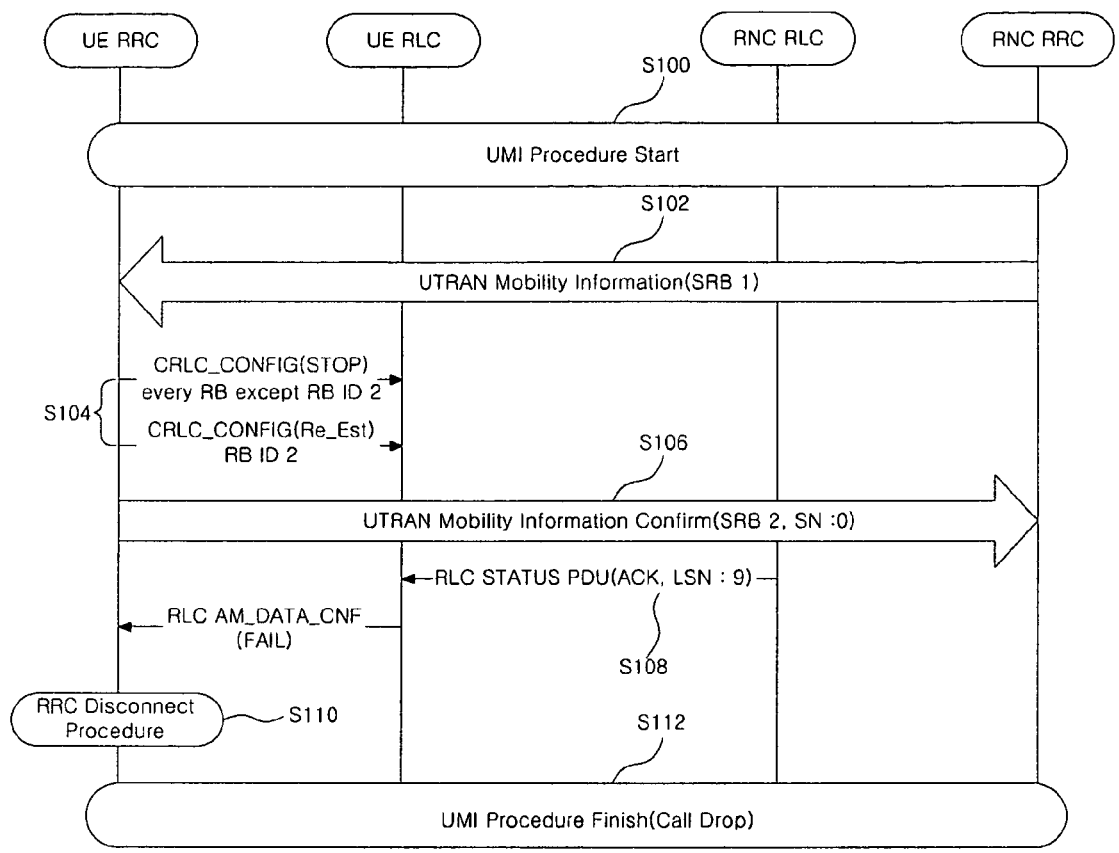
FIG. 1 and FIG. 2 are views illustrating examples of call drop in conventional SRNS relocation.
Figure 2:
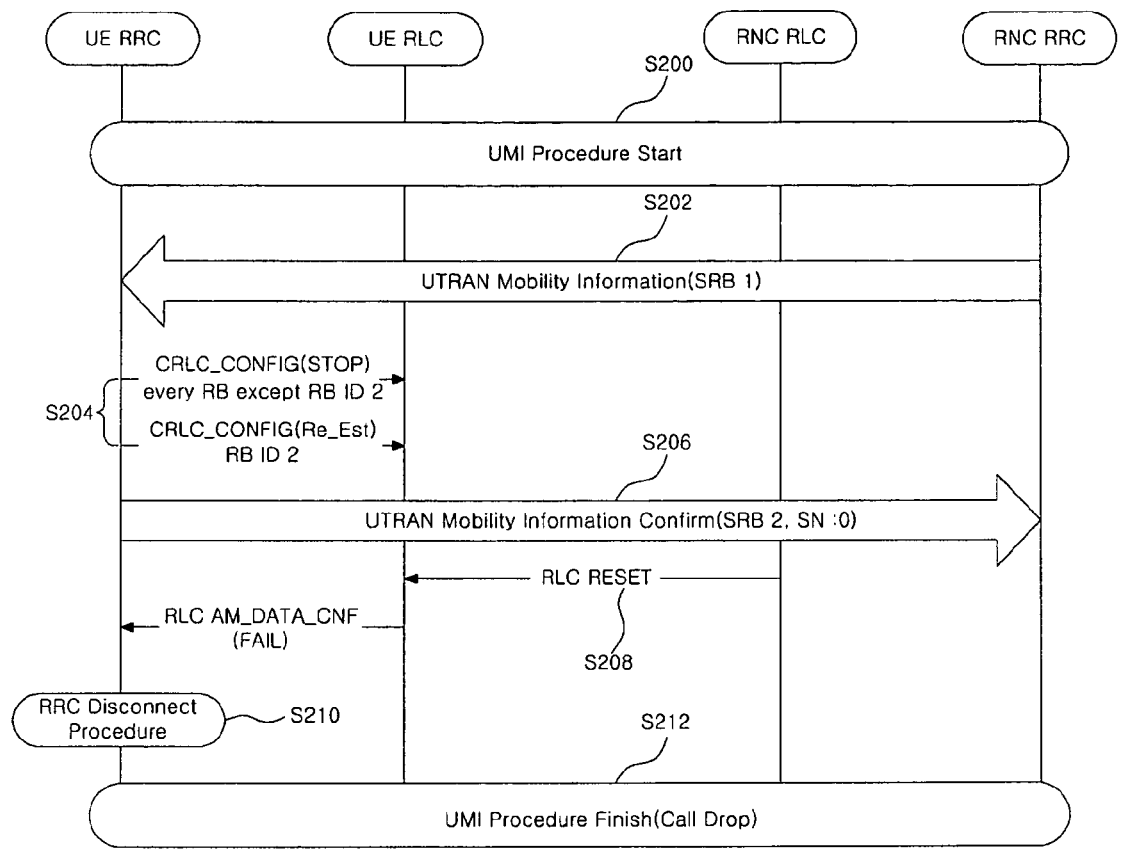
Figure 3:
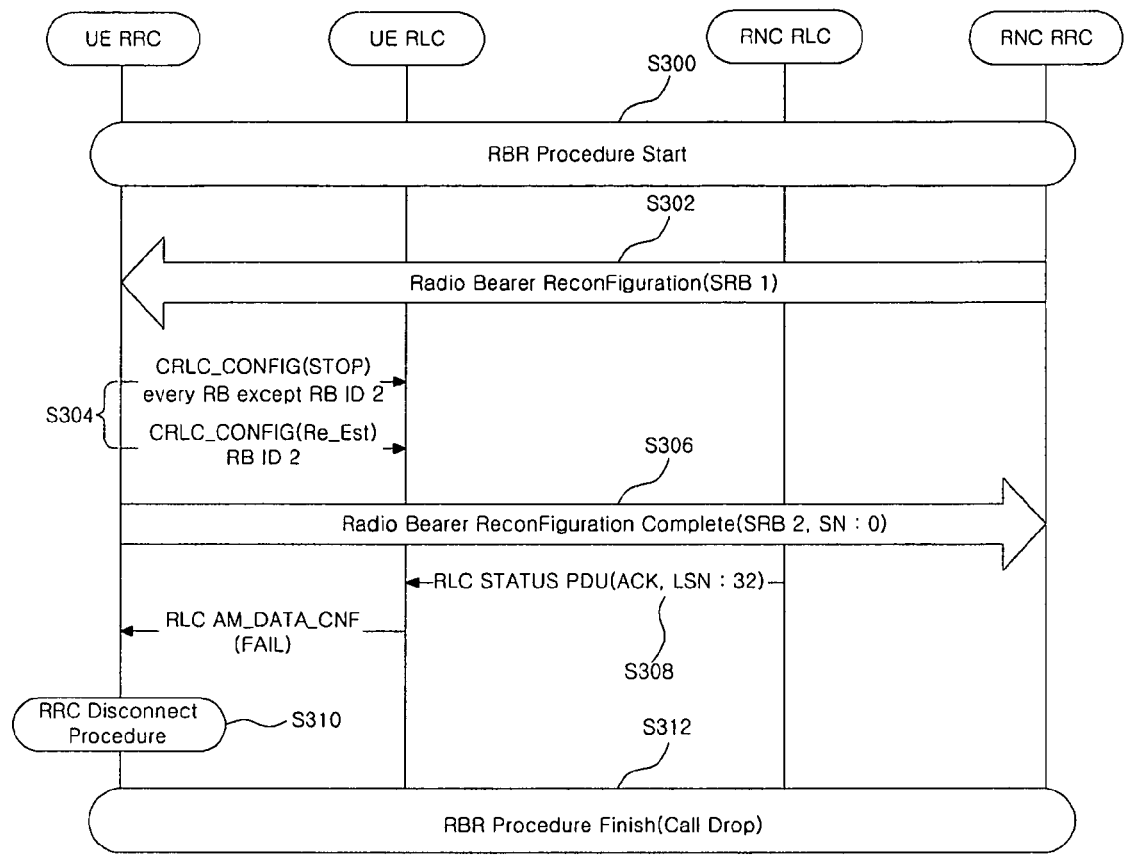
FIG. 3 and FIG. 4 are views illustrating another example of call drop.
Figure 4:
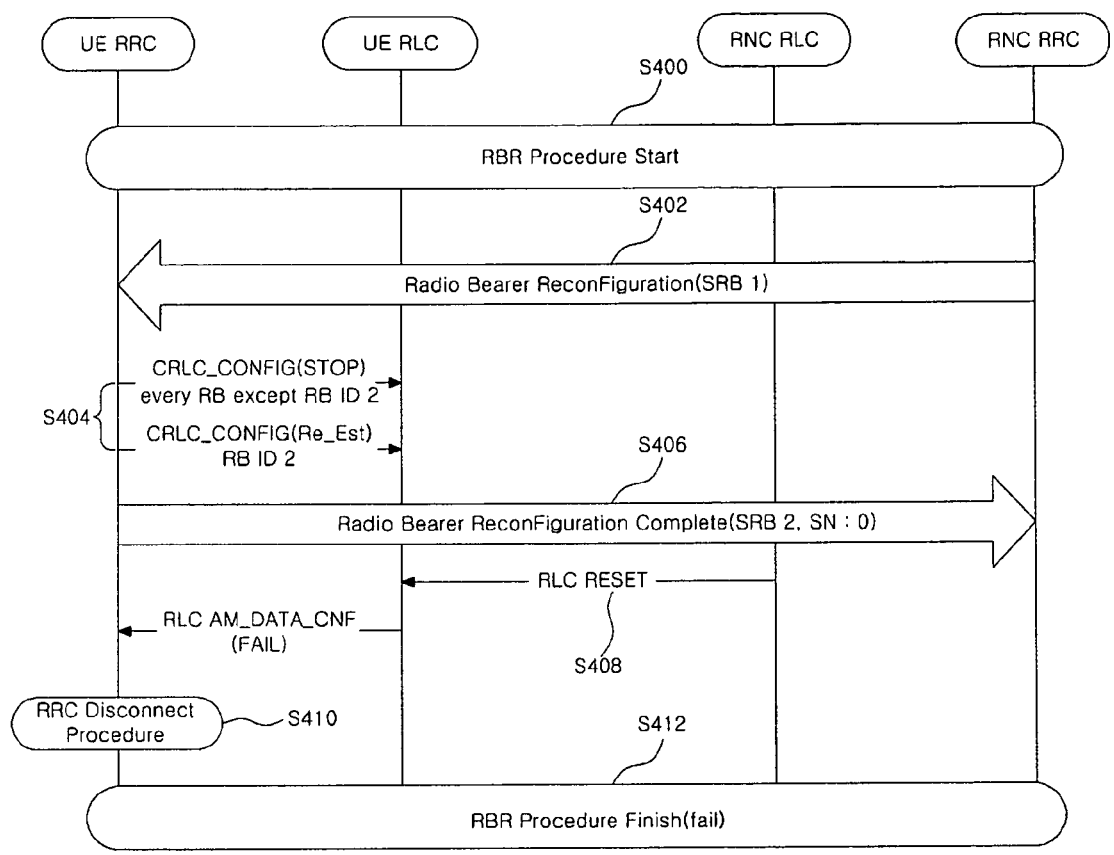

Example embodiments of the present invention are disclosed herein. However, specific structural and functional details disclosed herein are merely representative for purposes of describing example embodiments of the present invention, however, example embodiments of the present invention may be embodied in many alternate forms and should not be construed as limited to example embodiments of the present invention set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between", "adjacent" versus "directly adjacent", etc.).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 5:
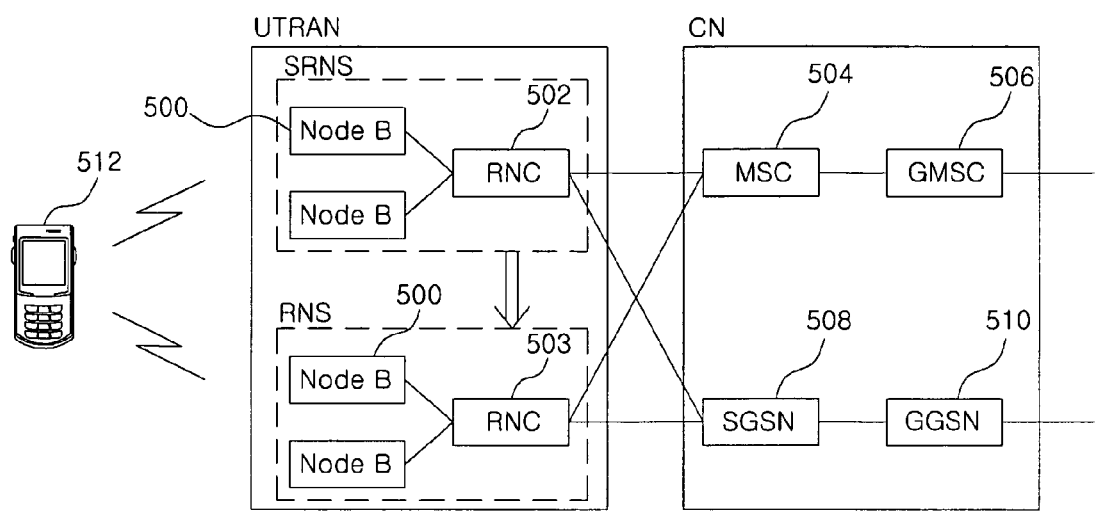
FIG. 5 is a view illustrating a mobile communication system according to one example embodiment of the present invention.

FIG. 5 is a view illustrating a mobile communication system according to one example embodiment of the present invention. Particularly, FIG. 5 shows the mobile communication system in 3GPP.

In FIG. 5, the mobile communication system of the present embodiment includes a node B 500 and a radio network controller RNC 502 in a radio network subsystem RNS, a mobile switching center MSC 504, a gateway MSC GMSC 506, a serving GPRS support node SGSN 508 and a gateway GPRS support node GGSN 510 in a core network.

The node B 500 sets a physical channel needed for data exchange with a mobile terminal 512 in accordance with control information delivered from the RNC 502, converts properly data delivered from an upper protocol in accordance with radio configuration, and transmits the converted data to the mobile terminal 512.

In addition, the node B 500 provides data transmitted from the mobile terminal 512 to an upper layer protocol of the RNC 502.

The RNC 502 controls its elements so as to assign dynamically radio resource of an UTRAN and performs switching function of transmitting data provided through the UTRAN to corresponding node B.

Additionally, the RNC 502 functions as a connection point for every service provided through the core network having the MSC 504 and the SGSN 508.

The core network performs function such as call control, session management, mobility management, etc, and includes a circuit switching area and a packet switching area.

The MSC 504 in the circuit switching area manages circuit-switched connection, manages mobility for location information update, location registration and paging, etc., and performs function related to data security.

The GMSC 506 in the circuit switching area connects the circuit switching area to an outside network.

The SGSN 508 in the packet switching area manages and supports packet switching service for the UTRAN, and performs function such as routing area update RAU and paging, etc. so as to manage the mobility of the mobile terminal 512 to which packet switching service is provided.

The GGSN 510 connects the packet switching area to other packet switching network such as Internet, etc.

On the other hand, the UTRAN of the mobile communication system has a serving radio network subsystem SRNS for managing dedicated radio resource assigned to the mobile terminal 512 as shown in FIG. 5.

In case of setting more shortly connection path between the mobile terminal 512 and the core network in response to moving of the mobile terminal 512, a path is changed from an initial SRNS into other SRNS. As a result, a target RNC 503 included in the other SRNS is assigned as new RNC instead of a source RNC 502 included in the initial SRNS, i.e. a SRNS assignment is performed.

Generally, the SRNS assignment is performed through an acknowledged mode AM so as to prevent loss of data. Accordingly, the source RNC 502 transmits information concerning unidentified data to the target RNC 503. Here, the source RNC 502 provides also serial number corresponding to the unidentified data to the target RNC 503.

Control about transmission of the data and the serial number is performed between a packet convergence protocol layer PDCP entity and a RRC entity of the source RNC 502. In addition, the data may be transmitted from a RRC entity of the source RNC 502 to a RRC entity of the target RNC 503.

In case that the RRC entity of the target RNC 503 receives the information concerning the unidentified data, etc. from the source RNC 502, the mobile terminal 512 performs a RLC configuration procedure in accordance with a specific control message provided from the target RNC 503. Then, the mobile terminal 512 transmits a complete message in accordance with the configuration procedure to the target RNC 503.

In case that exceptional case is occurred before the complete message is received, the mobile terminal 512 retransmits the complete message to the target RNC 503, thereby preventing call drop. Here, the control message may be an UTRAN mobility information UMI message or a radio bearer reconfiguration RBR message.

In case that the control message is the UMI message, the complete message may be an UMI confirm UMIC message.

However, in case that the control message is the RBR message, the complete message may be a RBR complete RBRC message.

Hereinafter, a method of preventing call drop in accordance with the UMI message/UMIC message and a method of preventing call drop in accordance with the RBR message/RBRC message will be described in detail.

(1) First Embodiment (UMI Procedure)

In the UMI procedure, the mobile terminal 512 transmits the UMIC message to the target RNC 503 in case that the mobile terminal 512 receives the UMI message from the target RNC 503. In this case, the mobile terminal 512 should receive ACK about the UMIC message from the target RNC 503 in accordance with the AM.

In one example embodiment of the present invention, the mobile terminal 512 retransmits the UMIC message to the target RNC 503 in case that exceptional case is occurred while the mobile terminal 512 awaits the ACK, thereby preventing call drop.

In the AM, serial numbers of data exchanged between the mobile terminal 512 and the RNC 503 should be synchronized.

The exceptional case corresponds to case that the serial numbers are not synchronized or case that ACK is not normally delivered.

In case that this exceptional case is occurred, the mobile terminal 512 of the present embodiment retransmits the UMIC message to complete normally the SRNS relocation.

Figure 6:
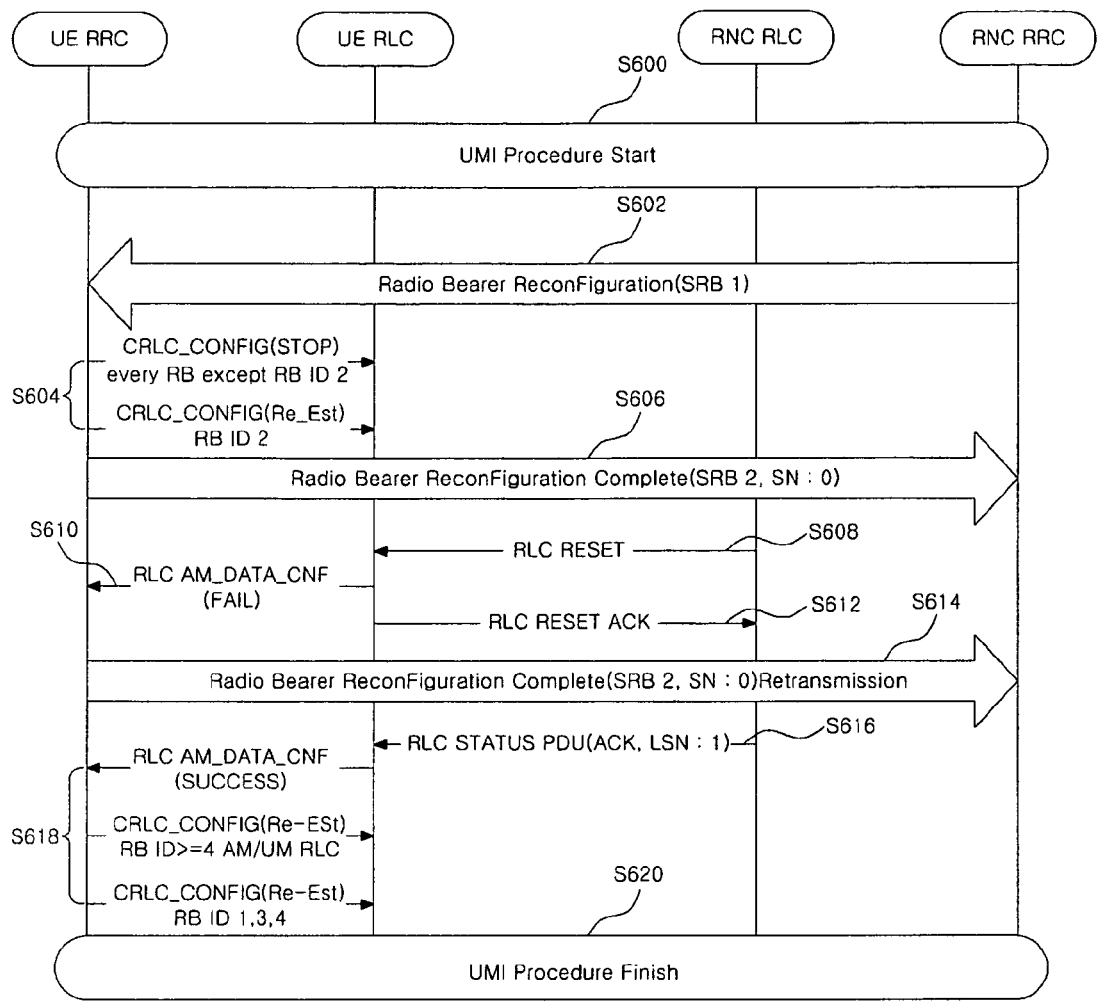
FIG. 6 and FIG. 7 are views illustrating a process of retransmitting the UMIC message according to a first example embodiment of the present invention.
Figure 7:
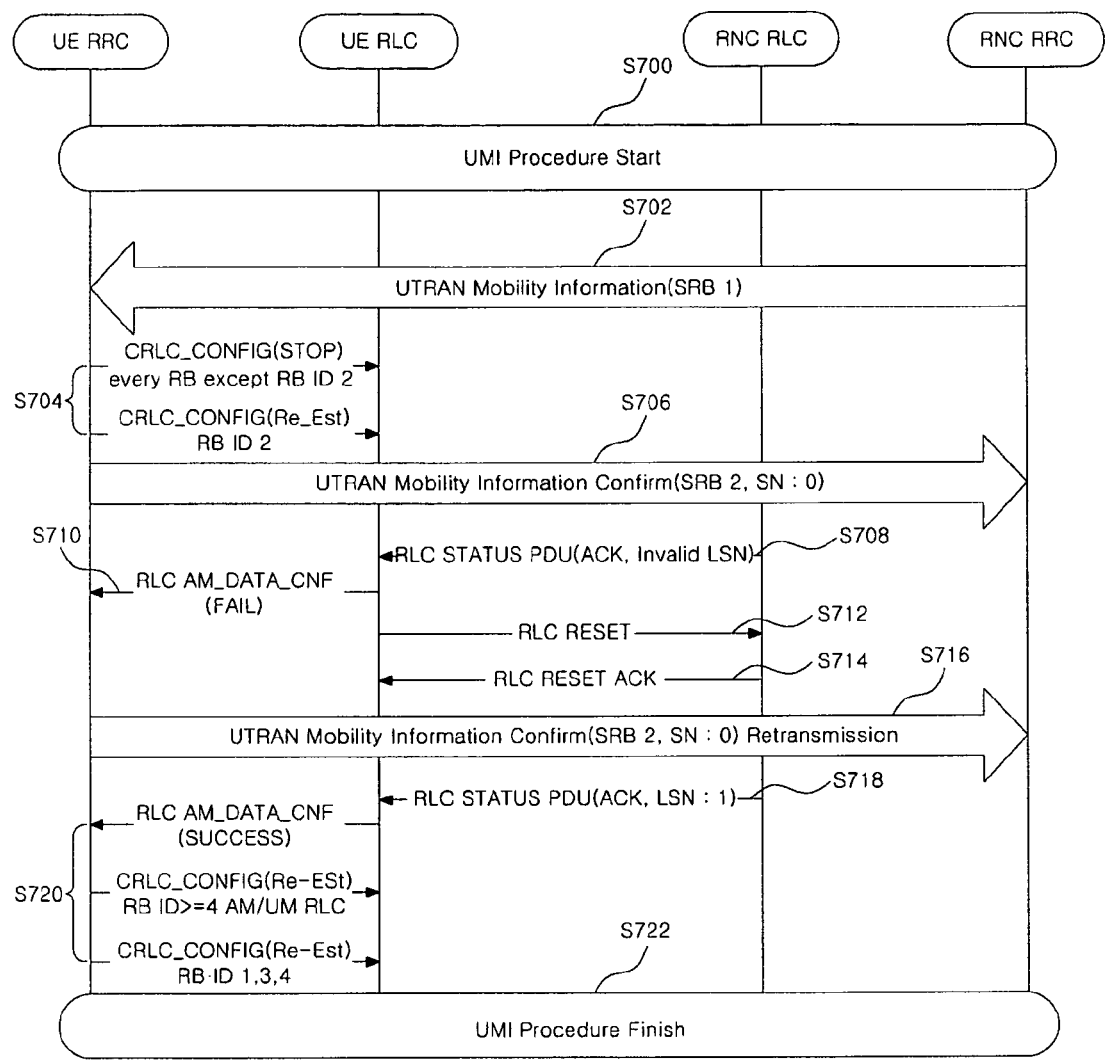

FIG. 6 and FIG. 7 are views illustrating a process of retransmitting the UMIC message according to a first example embodiment of the present invention.

Referring to FIG. 6, in step S600, an UMI procedure is started between the target RNC 503 and the mobile terminal 512 in case that the target RNC 503 receives information concerning unidentified data from the source RNC 502.

In step S602, the RRC entity of the target RNC 503 transmits the UMI message to the RRC entity of the mobile terminal 512. Here, the UMI message is transmitted through a signaling radio bearer SRB1.

In step S604, the mobile terminal 512 receiving the UMI message resets its RLC entity. Here, the step S604 is a step for initializing a RLC buffer and a variable of the mobile terminal 512. Particularly, the RRC entity of the mobile terminal 512 stops every radio bearer service except a radio bearer RB ID2, and resets the RB ID2.

In step S606, the RRC entity of the mobile terminal 512 transmits the UMIC message to the RRC entity of the target RNC 503. Here, the UMIC message is transmitted through the radio bearer SRB2 corresponding to the RB ID2, and has serial number SN0 in accordance with the RLC reset.

The mobile terminal 512 awaits ACK about the UMIC message from the target RNC 503 after the UMIC message is transmitted. In this case, the RLC entity of the mobile terminal 512 may receive a RLC RESET protocol data unit PDU from the RLC entity of the target RNC 503 due to occurrence of the exceptional case in step S608.

The step S608 may be also performed in case that the target RNC 503 does not receive corresponding ACK in accordance with the unidentified data transmitted from the source RNC 502, etc. For example, in case that the source RNC 502 transmits a measurement control message MCM to the mobile terminal 512 and then the target RNC 503 awaits ACK (is transmitted from the mobile terminal 512 to the source RNC 502 if the SRNS relocation is not started) about the MCM from the mobile terminal 512 in accordance with start of the SRNS relocation, the target RNC 503 may discriminate whether or not the ACK is normally received. Here, in case that the target RNC 503 does not receive the ACK about the MCM from the mobile terminal 512, in case that the target RNC 503 receives NACK, or in case that the target RNC 503 does not receive the ACK having desired serial number by the RLC reset in the step S604, the RLC entity of the target RNC 503 transmits the RLC RESET PDU to the RLC entity of the mobile terminal 512 in the step S608.

In step S610, the RLC entity of the mobile terminal 512 transmits an AM data verifying fail message to the RRC entity of the mobile terminal 512.

In step S612, the RLC entity of the mobile terminal 512 transmits ACK in accordance with the RLC reset to the RLC entity of the target RNC 503.

In step S614, the RRC entity of the mobile terminal 512 retransmits the UMIC message to the RRC entity of the target RNC 503 in case that the RRC entity of the mobile terminal 512 receives the AM data verifying fail message. Here, the RRC entity of the mobile terminal 512 retransmits the UMIC message having the same radio bearer and serial number as in the step S606.

In step S616, the RLC entity of the target RNC 503 transmits a RLC STATUS PDU (ACK) about the UMIC message to the RLC entity of the mobile terminal 512.

Since the RLC reset is performed in the steps S608 to S612, the RLC entity of the target RNC 503 transmits the ACK (about the UMIC message) having serial number SN1 following the serial number of the UMIC message in the step S616.

In one example embodiment of the present invention, the UMIC message may be repeatedly transmitted whenever the steps S608 to S612 are performed between the mobile terminal 512 and the target RNC 503 due to occurrence of exceptional case, i.e. whenever the ACK about the UMIC message is not normally received.

In step S618, the mobile terminal 512 sets the radio bearer for data transmission/reception after the mobile terminal 512 receives the ACK about the UMIC message in step S618, and then the UMI procedure is finished in step S620.

FIG. 6 shows the process of retransmitting the UMIC message when the mobile terminal 512 receives the RLC RESET PDU from the target RNC 503. However, the process of retransmitting the UMIC message may be performed in case that the mobile terminal 512 transmits the RLC RESET PDU as shown in below FIG. 7.

Since steps S700 to S706 in FIG. 7 are the same as the steps S600 to S606 in FIG. 6, any further description concerning the same steps will be omitted.

In step S708, the RLC entity of the target RNC 503 transmits the ACK about the UMIC message to the RLC entity of the mobile terminal 512.

However, the RLC entity of the target RNC 503 may transmit the ACK having undesired serial number to the mobile terminal 512 due to the unidentified data and corresponding serial number provided from the source RNC 502 to the target RNC 503 in step S710.

For example, in case that the mobile terminal 512 awaits ACK having serial number SN1 in accordance with transmission of the UMIC message having the serial number SN0, the UMI procedure is treated as verifying fail if the mobile terminal 512 receives ACK having serial number SN9 from the target RNC 503 in step S710.

In step S712, the RLC entity of the mobile terminal 512 transmits a RLC RESET PDU to the RLC entity of the target RNC 503.

In step S714, the RLC entity of the target RNC 503 transmits ACK about the RLC RESET PDU to the RLC entity of the mobile terminal 512.

In above description, in case that the mobile terminal 512 receives the ACK having undesired serial number from the target RNC 503, the mobile terminal 512 transmits the RLC RESET PDU to the target RNC 503.

In another example embodiment of the present invention, in case that the mobile terminal 512 does not receive ACK according as the SRNS relocation is started under the condition that the mobile terminal 512 does not receive the ACK about data transmitted to the source RNC 502, or in case that the mobile terminal 512 receives NACK from the target RNC 503, the mobile terminal 512 may transmit the RLC RESET PDU to the target RNC 503.

In step S716, in case that the mobile terminal 512 receives ACK about the RLC RESET PDU from the target RNC 503, the RRC entity of the mobile terminal 512 retransmits the UMIC message to the RRC entity of the target RNC 503.

Since the RLC reset is performed in the steps S708 to S714, the UMIC message retransmitted in the step S716 has the same radio bearer and serial number as in the step S706.

In step S718, the RLC entity of the target RNC 503 transmits ACK (about the UMIC message) having desired serial number SN1 to the mobile terminal 512.

The mobile terminal 512 performs a radio bearer setting process, etc in step S720, and then the UMI procedure is finished in step S722.

In brief, the UMIC message may be repeatedly transmitted whenever the ACK is not normally received or whenever exceptional case corresponding to the RLC reset is occurred. Accordingly, call drop is not occurred though the RLC reset is performed after the UMIC message is transmitted.

Figure 8:
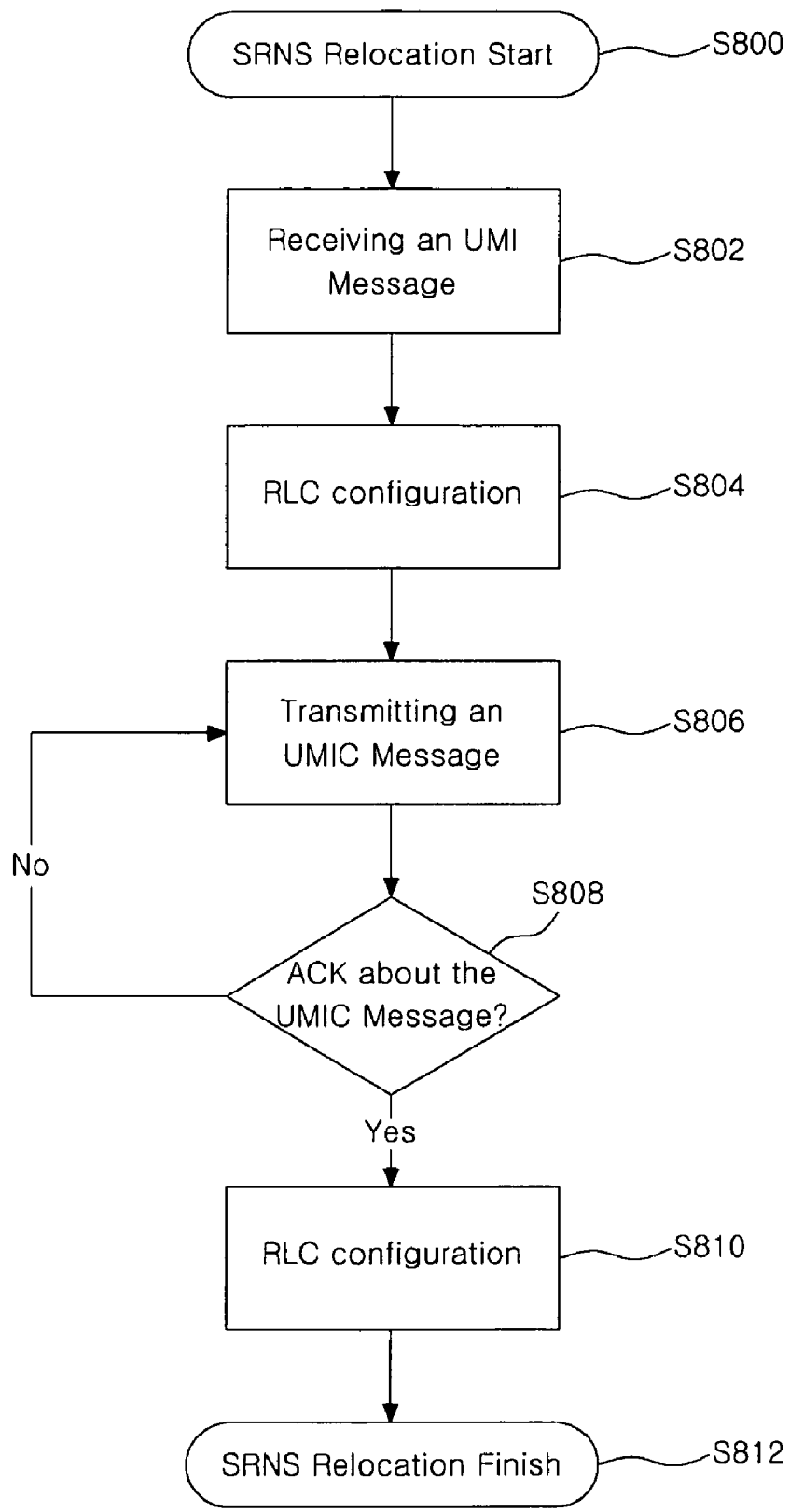
FIG. 8 is a flowchart illustrating a process of retransmitting the UMIC message according to a first example embodiment of the present invention.

FIG. 8 is a flowchart illustrating a process of retransmitting the UMIC message according to a first example embodiment of the present invention. Specially, FIG. 8 shows a process in the mobile terminal 512.

Referring to FIG. 8, in case that the SRNS relocation is started in step S800, the mobile terminal 512 receives the UMI message from the target RNC 503 in step S802.

The mobile terminal 512 performs the RLC configuration procedure in case that the UMI message is received in step S804, and then the mobile terminal 512 transmits the UMIC message to the target RNC 503 in step S806.

In step S808, the mobile terminal 512 discriminates whether or not the mobile terminal 512 receives normal ACK about the UMIC message from the target RNC 503.

In case that the ACK is not normally received, the step S806 is performed again.

The RLC configuration procedure is performed in case that the ACK is normally received in step S810, and then the SRNS relocation is completed in step S812.

(2) Second Example Embodiment (RBR Procedure)

The second example embodiment of the present invention relates to the RBR procedure in the SRNS relocation.

In case that the RBR procedure is performed, the mobile terminal 512 transmits a RBR complete RBRC message to the target RNC 503 when the mobile terminal 512 receives a RBR message from the target RNC 503. In this case, the mobile terminal 512 should receive ACK about the RBRC message from the target RNC 503 in accordance with the AM.

In one example embodiment of the present invention, in case that exceptional case is occurred while the mobile terminal 512 awaits the ACK, the mobile terminal 512 retransmits the RBRC message to the target RNC 503, thereby preventing call drop.

In the AM, serial numbers delivered between the mobile terminal 512 and the target RNC 503 should be synchronized. Here, the exceptional case corresponds to a case that the serial numbers are not synchronized, or a case that the ACK about the data is not normally received.

In case that this exceptional case is occurred, the mobile terminal 512 retransmits the RBRC message to the target RNC 503 so that the RBR procedure is normally completed.

Figure 9:
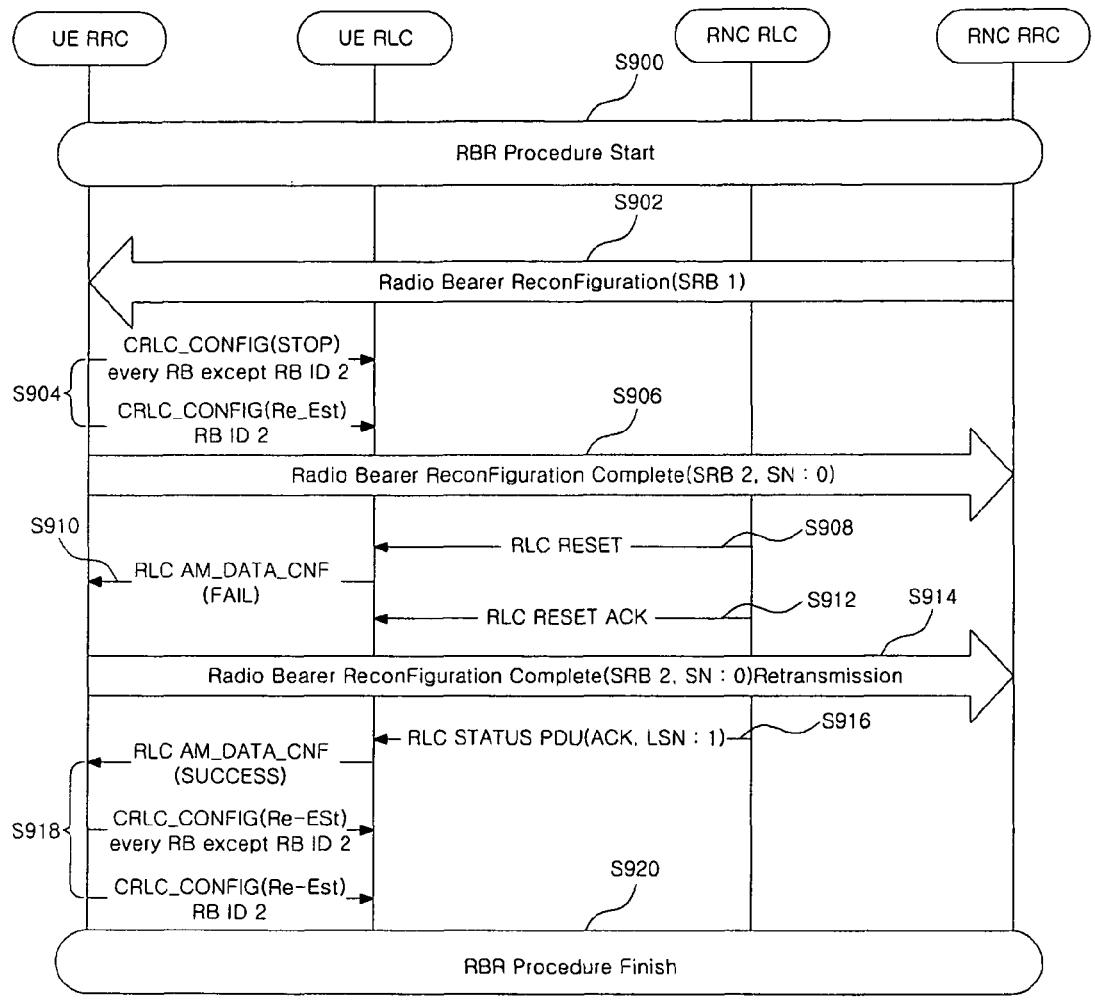
FIG. 9 and FIG. 10 are views illustrating a process of retransmitting the RBRC message according to a second example embodiment of the present invention.
Figure 10:
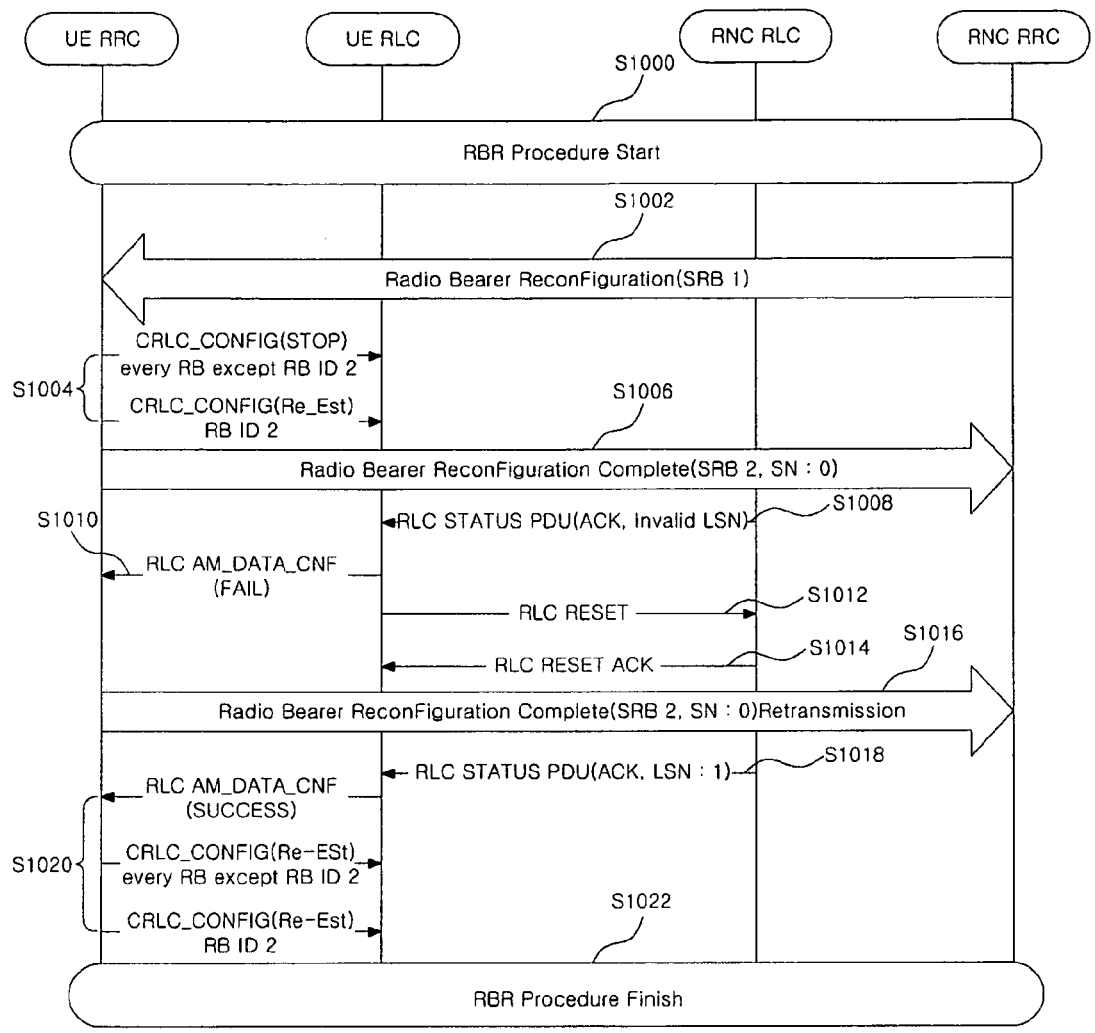

FIG. 9 and FIG. 10 are views illustrating a process of retransmitting he RBRC message according to a second example embodiment of the present invention.

Referring to FIG. 9, in step S900, in case that the target RNC 503 receives information concerning unidentified data from the source RNC 502, a RBR procedure is started between the target RNC 503 and the mobile terminal 512.

In step S902, the RRC entity of the target RNC 503 transmits the RBR message to the RRC entity of the mobile terminal 512. Here, the RBR message is transmitted through a signaling radio bearer SRB2.

In step S904, the mobile terminal 512 performs a RLC reset procedure when the mobile terminal 512 receives the RBR message. Here, a RLC buffer and a variable of the mobile terminal 512 are reset. That is, the RRC entity of the mobile terminal 512 stops every bearer service except RB ID2, and resets the RB ID2.

In step S906, the RRC entity of the mobile terminal 512 transmits the RBRC message to the RRC entity of the target RNC 503. Here, the RBRC message is transmitted through a radio bearer SRB2 corresponding to the RB ID2, and has serial number SN0 in accordance with the RLC reset.

The mobile terminal 512 awaits ACK about the RBRC message after the RBRC message is transmitted. In this case, the RLC entity of the mobile terminal 512 may receive a RLC RESET PDU from the RLC entity of the target RNC 503 in step S908.

The step S908 may be also performed in case that the target RNC 503 does not receive corresponding ACK in accordance with the unidentified data transmitted from the source RNC 502, etc. For example, in case that the source RNC 502 transmits a measurement control message MCM to the mobile terminal 512 and then the RBR procedure is performed while the target RNC 503 awaits ACK about the MCM from the mobile terminal 512, the target RNC 503 may discriminate whether or not the ACK is normally received. Here, in case that the target RNC 503 does not receive the ACK about the MCM from the mobile terminal 512, in case that the target RNC 503 receives NACK, or in case that the target RNC 503 does not receive the ACK having desired serial number by the RLC reset in the step S904, the RLC entity of the target RNC 503 transmits the RLC RESET PDU to the RLC entity of the mobile terminal 512 in the step S908.

In step S910, the RLC entity of the mobile terminal 512 transmits an AM data verifying fail message to the RRC entity of the mobile terminal 512 in accordance with the transmitted RLC RESET PDU.

In step S912, the RLC entity of the mobile terminal 512 transmits ACK about the RLC RESET PDU to the RLC entity of the target RNC 503.

In step S914, the RRC entity of the mobile terminal 512 retransmits the RBRC message to the RRC entity of the target RNC 503 in case that the RRC entity of the mobile terminal 512 receives the data verifying fail message. Here, the RBRC message in the step S914 has the same radio bearer and serial number as in the step S806.

In step S916, the RLC entity of the target RNC 503 transmits ACK about the RBRC message, i.e. RLC STATUS PDU to the RLC entity of the mobile terminal 512.

Since the RLC reset is performed in the steps S908 to S912, the RLC entity of the target RNC 503 may transmit the ACK (about the RBRC message) having serial number SN1 following the serial number of the RBRC message to the RLC entity of the mobile terminal 512 in the step S916.

In one example embodiment of the present invention, the RBRC message may be repeatedly transmitted whenever the steps S908 to S912 are performed between the mobile terminal 512 and the target RNC 503 due to occurrence of exceptional case, i.e. whenever the ACK about RBRC message is not normally received.

In step S918, the mobile terminal 512 sets the radio bearer for data transmission/reception after the mobile terminal 512 receives the ACK about the RBRC message in step S918, and then the RBR procedure is finished in step S920.

FIG. 9 shows the process of retransmitting the RBRC message when the mobile terminal 512 receives the RLC RESET PDU from the target RNC 503. However, the process of retransmitting the RBRC message may be performed in case that the mobile terminal 512 transmits the RLC RESET PDU as shown in below FIG. 10.

Since steps S1000 to S1006 in FIG. 10 are the same as the steps S900 to S906 in FIG. 9, any further description concerning the same steps will be omitted.

In step S1008, the RLC entity of the target RNC 503 transmits the ACK about the RBRC message to the RLC entity of the mobile terminal 512.

However, the RLC entity of the target RNC 503 may transmit the ACK having undesired serial number to the mobile terminal 512 due to the unidentified data and corresponding serial number provided from the source RNC 502 to the target RNC 503 in the step S1008.

For example, in case that the mobile terminal 512 awaits ACK having serial number SN1 in accordance with transmission of the RBRC message having the serial number SN0, the RBR procedure is treated as verifying fail in the step S912 if the mobile terminal 512 receives ACK having serial number SN9 from the target RNC 503 in step S1010.

In step S1012, the RLC entity of the mobile terminal 512 transmits a RLC RESET PDU to the RLC entity of the target RNC 503.

In step S1014, the RLC entity of the target RNC 503 transmits ACK about the RLC RESET PDU to the RLC entity of the mobile terminal 512.

In above description, in case that the mobile terminal 512 receives the ACK having undesired serial number from the target RNC 503, the mobile terminal 512 transmits the RLC RESET PDU to the target RNC 503.

In another example embodiment of the present invention, in case that the mobile terminal 512 does not receive corresponding ACK from the target RNC 503 according as the SRNS relocation is started under the condition that the mobile terminal 512 does not receive ACK about the data transmitted to the source RNC 502, or in case that the mobile terminal 512 receives NACK from the target RNC 503, the mobile terminal 512 may transmit the RLC RESET PDU to the target RNC 503.

In step S1016, in case that the mobile terminal 512 receives the ACK about the RLC RESET PDU from the target RNC 503, the RRC entity of the mobile terminal 512 retransmits the RBRC message to the RRC entity of the target RNC 503.

Since the RLC reset is performed in the steps S1008 to S1014, the RBRC message retransmitted in the step S1016 has the same radio bearer and serial number as in the step S1006.

In step S1018, the RLC entity of the target RNC 503 transmits ACK (about the RBRC message) having desired serial number SN1 to the mobile terminal 512.

The mobile terminal 512 performs a radio bearer setting procedure, etc in step S1020, and then the RBR procedure is finished in step S1022.

In brief, the RBRC message may be repeatedly transmitted whenever the ACK is not normally received or whenever exceptional case corresponding to the RLC reset is occurred. Accordingly, call drop is not occurred though the RLC reset is performed after the RBRC message is transmitted.

Figure 11:
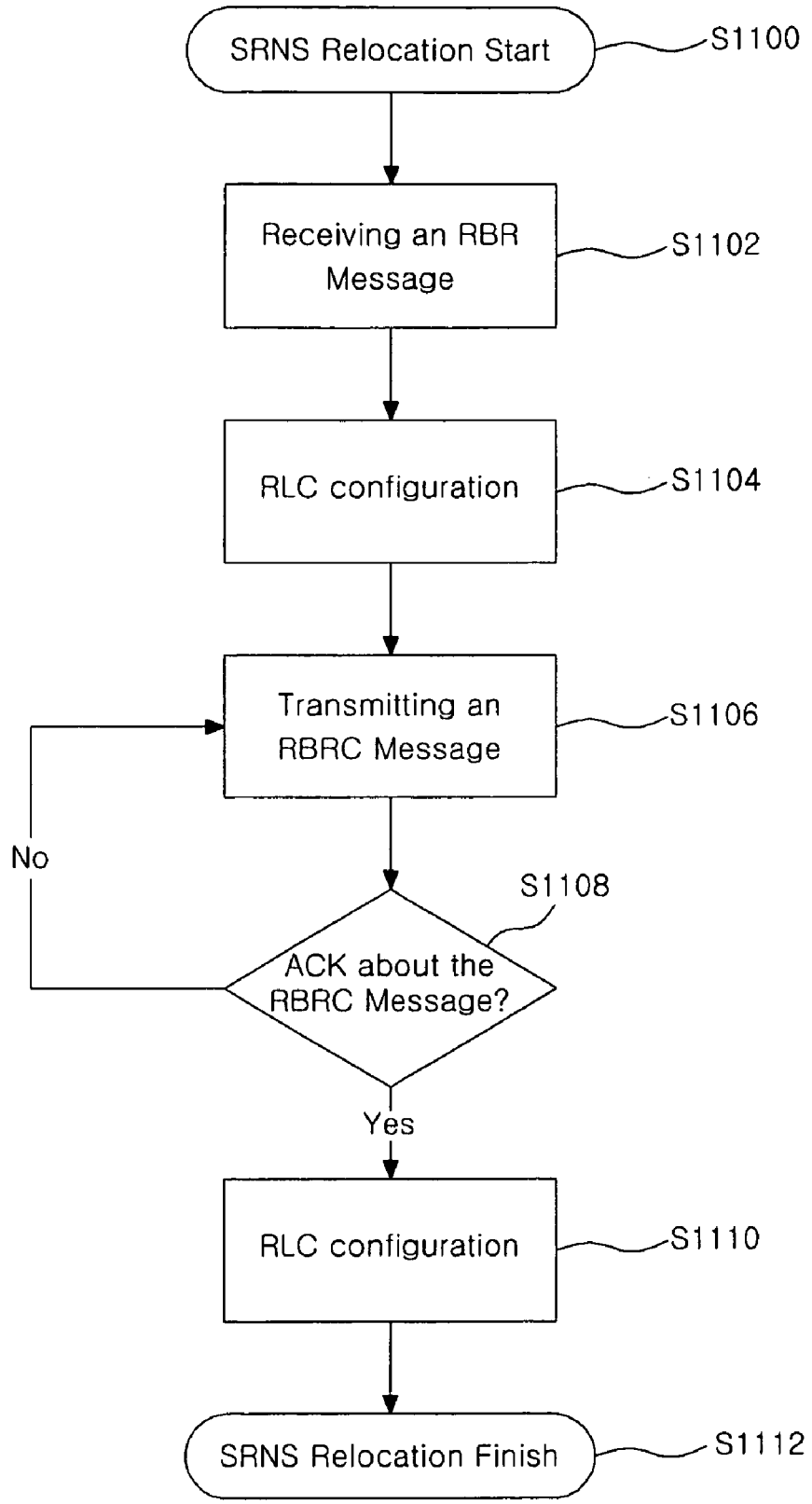
FIG. 11 is a flowchart illustrating a process of retransmitting the RBRC message according to one example embodiment of the present invention.

FIG. 11 is a flowchart illustrating a process of retransmitting the RBRC message according to one example embodiment of the present invention. Specially, FIG. 11 shows a process in the mobile terminal 512.

Referring to FIG. 11, in case that the SRNS relocation is started in step S1100, the mobile terminal 512 receives the RBR message from the target RNC 503 in step S1102.

The mobile terminal 512 performs the RLC configuration procedure in case that the RBR message is received in step S1104, and then the mobile terminal 512 transmits the RBRC message to the target RNC 503 in step S1106.

In step S1108, the mobile terminal 512 discriminates whether or not the mobile terminal 512 receives the ACK about the RBRC message from the target RNC 503.

In case that the ACK is not received, the step S1106 is performed again.

The RLC configuration procedure is performed in case that the ACK is normally received in step S1110, and then the SRNS relocation is completed in step S1112.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The invention claimed is:

1. A method of preventing call drop in a mobile terminal when a serving radio network subsystem SRNS relocation to a target RNC from a source RNC is performed, the method comprising:
   receiving a control message in accordance with start of the SRNS relocation from the target RNC;
   performing a RLC configuration procedure;
   transmitting a complete message in accordance with the RLC configuration procedure to the target RNC;
   receiving a RLC RESET message from the target RNC when an exceptional case occurs after the complete message is transmitted; and
   retransmitting the complete message to the target RNC in accordance with the received RLC RESET message, wherein the exception case includes at least one of,
      a case that a message having an undesired serial number is delivered between the mobile terminal and the target RNC,
      a case that the target RNC does not receive a normal ACK from the mobile terminal in response to unidentified data transmitted from the source RNC before the SRNS relocation is started,
      a case that the target RNC receives a NACK,
      a case that the mobile terminal does not receive a normal ACK from the target RNC in response to unidentified data transmitted from the source RNC before the SRNS relocation is started, and
      a case that the mobile terminal receives a NACK.

2. The method of claim 1, wherein the control message is at least one of an UTRAN mobility information UMI message or a radio bearer reconfiguration RBR message.

3. The method of claim 2, wherein the complete message is an UMI confirm UMIC message in case that the control message is the UMI message.

4. The method of claim 2, wherein the complete message is a RBR confirm RBRC message in case that the control message is the RBR message.

5. The method of claim 1, wherein the RLC is reset when the exception case occurs and the retransmitting is repeatedly performed whenever the RLC reset is performed.

6. The method of claim 1, wherein the retransmitting retransmits the complete message having the same radio bearer and serial number as in the transmitting.

7. The method of claim 6, wherein an RLC entity of the target RNC transmits ACK having serial number following serial number of the control message to an RLC entity of the mobile terminal.

8. The method of claim 1, wherein the RLC reset is performed by RLC layers of the mobile terminal and the target RNC.

9. A method of preventing call drop in a target RNC when SRNS relocation is performed, the method comprising:
   transmitting a control message in accordance with start of the SRNS relocation to a mobile terminal;
   receiving a complete message about a RLC configuration procedure from the mobile terminal;
   transmitting RLC RESET message to the mobile terminal when an exceptional case occurs;
   receiving the complete message retransmitted from the mobile terminal when an exception case occurs; and
   transmitting a RLC STATUS protocol data unit RLC STATUS PDU having a serial number consecutive to a serial number of the complete message to the mobile terminal, wherein the exception case includes at least one of,
      a case that an undesired serial number is delivered between the mobile terminal and a target RNC,
      a case that the target RNC does not receive a normal ACK from the mobile terminal in response to unidentified data transmitted from a source RNC before the SRNS relocation is started,
      a case that the target RNC receives a NACK,
      a case that the mobile terminal does not receive a normal ACK from the target RNC in response to unidentified data transmitted from the source RNC before the SRNS relocation is started, and
      a case that the mobile terminal receives a NACK.

10. The method of claim 9, wherein the control message is at least one of an UTRAN mobility information UMI message or a radio bearer reconfiguration RBR message.

11. The method of claim 10, wherein the complete message is an UMI confirm UMIC message in case that the control message is the UMI message.

12. The method of claim 10, wherein the complete message is a RBR confirm RBRC message in case that the control message is the RBR message.

13. The method of claim 9, wherein RLC entities of the mobile terminal and a target RNC are reset based on the transmission of the RLC RESET message.

14. An apparatus comprising:
   an RRC entity configured to receive a control message in accordance with start of an SRNS relocation from an RRC entity of a target RNC when the SRNS relocation to the target RNC from a source RNC is performed, transmit a complete message in accordance with RLC configuration to the target RNC, and retransmit the complete message to the RRC entity of the target RNC when an exception case occurs after the complete message is transmitted; and
   an RLC entity configured to receive ACK about the retransmitted complete message from a RLC entity of the target RNC, wherein the RLC entity of the target RNC and the RLC entity of the apparatus are reset when the exception case occurs before ACK about the complete message in accordance with the RLC configuration is received, wherein the RLC entity receives a RLC RESET message from the target RNC, the RRC entity retransmits the complete message in accordance with the received RLC RESET message, and the exception case includes at least one of, a case that a message having an undesired serial number is delivered between the mobile terminal and the target RNC,
a case that the target RNC does not receive a normal ACK from the mobile terminal in response to unidentified data transmitted from the source RNC before the SRNS relocation is started,
a case that the target RNC receives a NACK,
a case that the mobile terminal does not receive a normal ACK from the target RNC in response to unidentified data transmitted from the source RNC before the SRNS relocation is started, and
a case that the mobile terminal receives a NACK.

15. The apparatus of claim 14, wherein the control message is at least one of an UTRAN mobility information UMI message or a radio bearer reconfiguration RBR message.

16. The apparatus of claim 15, wherein the complete message is an UMI confirm UMIC message in case that the control message is the UMI message.

17. The apparatus of claim 15, wherein the complete message is a RBR confirm RBRC message in case that the control message is the RBR message.

18. A radio network controller RNC for managing an SRNS relocation comprising;
an RRC entity configured to transmit a control message in accordance with start of the SRNS relocation to a mobile terminal in case that unidentified data and corresponding serial number are received from a source RNC, and receive a complete message about RLC configuration; and
an RLC entity reset with a RLC entity of the mobile terminal when an exception case occurs before ACK about the complete message is received, and configured to transmit ACK about a retransmitted complete message to a RLC entity of the mobile terminal in case that the complete message retransmitted from the mobile terminal in accordance with the RLC reset is received, wherein the RLC entity transmits a RLC RESET message to the mobile terminal when an exceptional case occurs, the complete message is transmitted from the mobile terminal in a same manner as the RLC RESET message is transmitted to the mobile terminal, and the exception case includes at least one of,
a case that a message having an undesired serial number is delivered between the mobile terminal and a target RNC,
a case that the target RNC does not receive a normal ACK from the mobile terminal in response to unidentified data transmitted from a source RNC before the SRNS relocation is started,
a case that the target RNC receives NACK,
a case that the mobile terminal does not receive a normal ACK from the target RNC in response to unidentified data transmitted from the source RNC before the SRNS relocation is started, and
a case that the mobile terminal receives NACK.

* * * * *